Feb. 23, 1954

R. H. SKIDMORE 2,669,881

GEAR REDUCTION UNIT

Filed Sept. 21, 1950

2 Sheets-Sheet 1

INVENTOR.
RICHARD H. SKIDMORE
BY
Bosworth + Sessions
ATTORNEYS.

INVENTOR.
RICHARD H. SKIDMORE
BY
Bosworth & Sessions
ATTORNEYS.

Patented Feb. 23, 1954

2,669,881

UNITED STATES PATENT OFFICE 2,669,881

GEAR REDUCTION UNIT

Richard H. Skidmore, Lyndhurst, Ohio

Application September 21, 1950, Serial No. 186,066

1 Claim. (Cl. 74—421)

This invention relates to gearing units and in particular to geared speed change mechanisms used to transmit power from a driving means to a driven unit at reduced speeds.

The selection of speed change devices or reducers for the various applications of power transmission at reduced speeds involves several important considerations. The reducer should be capable of effecting a large variety of speed reductions in order to meet the varied demands of industry for practically any speed reduction ratio between the driving and driven units. It should operate at high efficiency, that is, with a minimum loss of power between the driving and driven units to which it is coupled. The reducer should also be compact so as to occupy a minimum of space during use and when it is stored, and to facilitate installation and removal of same.

Another important consideration is the initial cost of the reducer which should be as low as possible.

One of the problems which has confronted industry for a long time and the problem to which the present invention is addressed is how to produce a speed reducer which combines all of these features. Heretofore, highly efficient reducers have usually been high priced. Also, the number of reduction ratios within a given range of reductions which reducers in the past have been capable of effecting are quite limited; if the particular speed reduction application calls for a reduction ratio that is outside of the ratios provided for in conventional reducers, either a special unit must be assembled to meet the needs of that particular application with a consequent increase in cost, or the user must select a standard reducer whose operating characteristics are the closest to his specifications but which do not meet them, and this results in undesirable operating inefficiencies.

One of the objects of my invention is to provide a speed reducer in which all of the above mentioned features are included in a single unit. A more specific object is to provide a reducer in which the same gear box, casing or housing is used to contain, support and enclose gearing having a large variety of reduction ratios. Another object is to provide a reducer that is highly efficient in the transmission of power. A further object is to provide a speed reducer that may be manufactured at low cost without sacrificing operating efficiency or limiting the flexibility of application of the unit. A still further object is to provide a reducer that is compact, simple in design, quiet in operation and structurally rugged.

Figure 1:
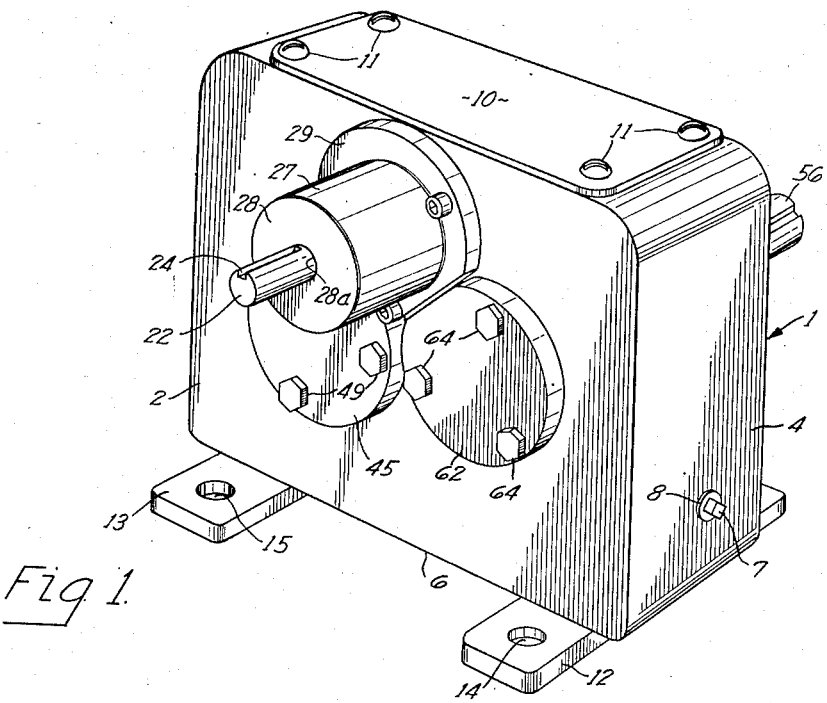
Figure 2:
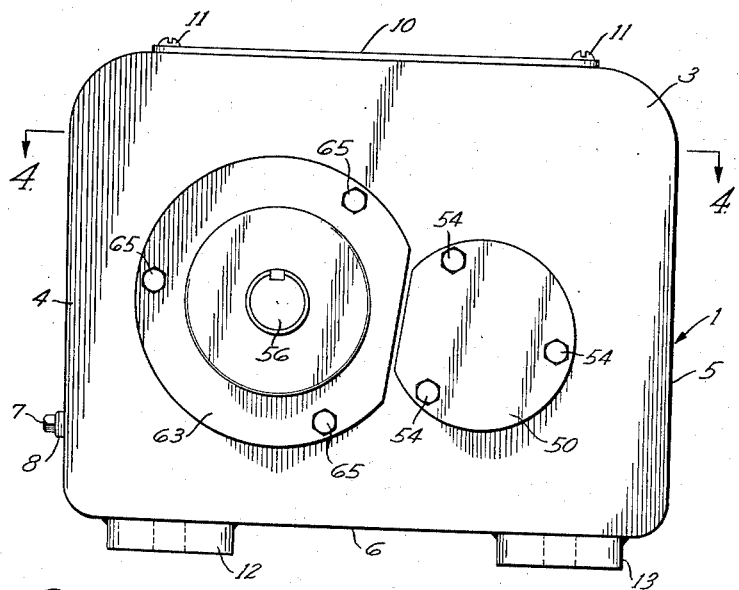
Figure 3:
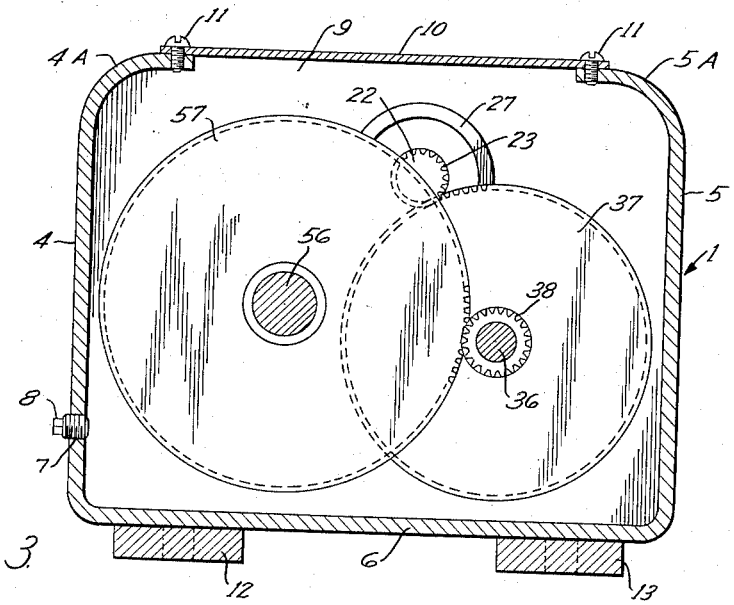
Figure 4:
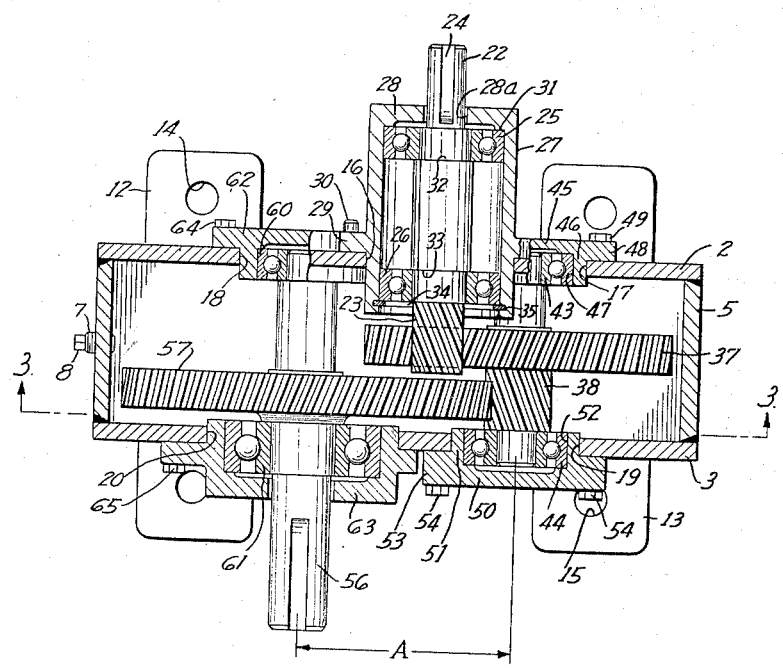

These and other objects of my invention will become apparent from the following description of a preferred form thereof, reference being had to the accompanying drawings in which Figure 1 is a perspective view of the reducer showing the "high speed" or power input shaft; Figure 2 is a side elevation of the reducer showing the "low speed" or power output shaft; Figure 3 is a vertical section taken on the line 3—3 of Figure 4 and showing the arrangement of the various gears within the casing; and Figure 4 is a transverse section taken on the line 4—4 of Figure 2.

My invention contemplates a train of helical gears mounted on substantially parallel shafts and arranged in a cluster within the gear casing or housing so that a minimum center to center spacing between the shafts and thus the respective gears is maintained. With the gear train thus arranged, in contrast to a spread out grouping of the individual gears, the casing or housing in which the train is contained may likewise be formed with minimum dimensions. I preferably employ helical gears in the reduction train because these gears are quiet in operation and highly efficient in the transmission of power. In addition, the use of helical gears permits the construction and assembly of reducers which have a large number of reduction ratios within a practical range and for a given horsepower rating and all of which utilize the same housing unit. Thus the housing unit or casing may be standardized, that is, the same housing is used to enclose different gear trains having a large number of different reduction ratios and it is only necessary to select appropriate gearing to be assembled with the same housing to obtain a reducer having a desired reduction ratio.

The use of standardized housings to accommodate and enclose a number of different gear trains having a corresponding number of different reduction ratios requires that the center spacing between meshing gears be substantially the same for the various gear trains in order that the same bearing supports on the housing may be used to mount the different gear trains within the housing. It is also important that the feature of flexibility of the gearing system in being able to effect any one of a large number of speed reductions as may be required in various applications be maintained in spite of the constant center spacing between meshing gears in the train. In accordance with the precepts of the present invention, helical gears are used in the reduction train and the desired reduction ratio is attained by determining the number of teeth required on the respective meshing gears to give that ratio. Thereafter, the helix angle to which the teeth are cut, which is a function of the center spacing between the gears, is determined for the fixed value of the center spacing and the predetermined number of teeth are formed on the respective meshing gears at this predetermined helix angle. Several pairs of gears having a large variety of reduction ratios may thus be made and mounted in standardized housings to form an equal number of finished reducers with a corresponding variety of reduction ratios. The housing is constructed so as to permit portions of the gear train to be conveniently removed and to allow other gears having a different number of teeth to be substituted. This permits the overall reduction ratio of the reducer to be changed merely by replacement of but a few parts of the whole reducer.

Referring now to the drawings, Figures 1 and 2 show a speed reducer which includes a housing or casing 1 in which the reduction gearing is enclosed. The housing 1 is preferably made of steel and has side walls 2 and 3 having substantially the same length and width. End walls 4 and 5 and the bottom wall 6 are preferably integral, being formed from a single piece or strip of steel which is bent or otherwise formed into a U-shape as shown in Figure 3 and thereafter suitably secured as by welding to side walls 2 and 3. The lower portion of end wall 4 is provided with a tapped hole 7 and a removable plug 8 to permit filling of the casing with lubricating oil. Access to the interior of the housing is made through an opening 9, see Figure 3, at the top thereof which is covered by a cover plate 10 removably secured by screws 11 to the bent over top portions 4a and 5a of the end walls 4 and 5. Foot members 12 and 13 having mounting holes 14 and 15, respectively, are secured to the underside of the housing 1 to facilitate mounting the reducer in position between the driving and driven units.

Prior to the assembly of side walls 2 and 3 with end walls 4 and 5 and bottom wall 6, bearing holes or apertures 16, 17 and 18, see Figure 4 are formed in plate 2. The bearing holes, along with similar holes or apertures 19 and 20 formed in the opposite side wall 3 are adapted to receive removable bearing units in which the individual shafts for supporting the gear train are mounted. Several plates may be cut at the same time from stacked sheets of steel plate to form a plurality of side walls 2 and 3, the overall dimensions of these side walls being the same. Thereafter, a stack of these pre-cut plates are simultaneously drilled or bored or punched to provide bearing holes 16, 17 and 18. After assembly and securing of the side walls, end walls and bottom wall together, bearing holes or apertures 19 and 20 are bored in side wall 3 so that same are aligned with bearing holes 17 and 18, respectively, in side wall 2. This construction of housing 1 permits mass production of component parts thereof which effects considerable savings in the cost of fabricating these housings.

For the purpose of illustrating and describing my invention I have shown in the drawings a double reduction speed reducer wherein two pairs of gears are employed in order to effect a speed reduction through this train of gears. It will be understood, however, that the precepts of my invention may be successfully followed in reducers having single, triple or more reductions without departing from the spirit and scope of the invention.

As shown in Figures 1 and 4 an input shaft 22 is mounted on the housing 1 so as to extend transversely of and through side wall 2 and preferably is formed with helical teeth 23, which constitute a pinion, at its inner end. The other end of shaft 22 has a keyway 24 for suitably connecting the shaft to a driving means such as electric motors, not shown. Shaft 22 is supported for rotation in a pair of spaced bearings 25 and 26, preferably ball bearings as shown, which are inserted into a cylindrical bearing casing 27. The outer end wall 28 of casing 27 has an aperture 28a through which shaft 22 extends for coupling to the driving means. An annular mounting flange 29, preferably formed integrally with casing 27 and extending radially therefrom, overlays portions of side wall 2 around bearing hole 14 and serves to properly position and removably secure casing 28 to the housing 1 by means of screws 30. Bearing 25 is firmly held in position between a shoulder 31 on the inner surface of end wall 28 of casing 27 and shoulder 32 of shaft 22, and bearing 26 abuts against a similar shoulder 33 on shaft 22 at the inner end of the casing 27. A split washer 34 adapted to seat in a groove 35 on the inner surface of casing 27 presses against the inner face of bearing 26 to hold same firmly against shoulder 33 of the shaft. It will be noted that whatever end thrust is experienced by shaft 22 during operation of the reducer will be effectively resisted by bearings 25 and 26. By utilizing the above described double bearing construction for supporting the input shaft, sufficient support is given to shaft 22 to maintain the same in proper position in the housing 1 so that it is not necessary to extend the shaft to the opposite side wall 2 of the housing for additional support. Thus, driving pinion 23 is located on the inner end of the input shaft intermediate the side walls 2 and 3 which arrangement permits a closer grouping of the other gears in the reducer and ultimately a more compact housing.

An intermediate shaft 36 extends transversely of the housing 1 parallel to and vertically offset from the input shaft 22 and supports thereon a large intermediate helical gear 37 and a small intermediate helical gear 38 for rotation relative to the housing. Gears 37 and 38 are non-rotatably mounted and removably fixed in position axially on shaft 36. The ends of shaft 36 are supported in ball bearings 43 and 44 which in turn are supported in bearing holes 17 and 19 in side walls 2 and 3, respectively. In order to accurately mount bearings 43 and 44 in bearing holes 17 and 19 of side walls 2 and 3 and also to permit shaft 36 to be conveniently removed from the housing for purposes that will be explained later, adapters 45 and 50 are provided for enclosing these bearings and the ends of shaft 36. Adapter 45 has a cylindrical body 46 which fits snugly in aperture 17 of the side wall, an inwardly facing recess 47 accurately machined to receive bearing 45, and an annular flange 48 having suitable mounting holes therein to receive cap screws 49 by which flange 48 is drawn up tightly against the outer surface of wall 2. Similarly, adapter 50 has a body portion 51 which fits into bearing hole 19, a recess 52 to receive bearing 44, and a flange 53 which is removably secured to side wall 3 by screws 54. Each of the adapters 45 and 50 may be removed from walls 2 and 3 by loosening screws 49 and 54 thereby exposing bearings 43 and 44 and the respective ends of intermediate shaft 36. Thereafter, the bearings may be removed from the shaft which may then be disengaged from gear 37 thereby permitting this gear to be removed from the interior of the housing. Another gear may be mounted on shaft 36 in place of gear 37 by merely reversing these steps.

An output shaft 56 is disposed to extend transversely of the housing on the opposite side of the center plane of input shaft 22 from the intermediate shaft 36. An output gear 57 is nonrotatably keyed and removably secured axially on shaft 56 and is aligned with the small intermediate gear 38 so as to mesh therewith and be driven thereby. Gear 57 is properly positioned axially on output shaft 56 by means of a shoulder on the shaft against which the inner face of the gear abuts while the opposite face thereof rides against the inner face of output ball bearing 61. The output shaft 56 is supported for rotation in ball bearings 60 and 61 which are mounted in bearing holes 18 and 20 of walls 2 and 3, respectively, by means of adapters 62 and 63 which are substantially the same in construction and function as adapters 45 and 50 above described. Screws 64 and 65 serve to hold the adapters 62 and 63, respectively, in position on side walls 2 and 3 of the housing. The output gear 56 may thus be removed from the housing 1 and replaced by another gear in the same manner described above in connection with removal and replacement of intermediate gear 37, that is, screws 64 and 65 are loosened and adapters 62 and 63 are removed from side walls 2 and 3, one of bearings 60 or 61 is removed and the shaft 56 slid transversely through bearing holes 19 and 17 thereby freeing the output gear 56 so that it may be removed through the opening 9 at the top of the housing and replaced by a similar gear.

Although the reduction ratio between pairs of gears, that is, between pinion 23 and intermediate gear 37 and gear 38 and output gear 56, may be varied as desired to obtain a required overall reduction between the input and output shafts, I prefer to maintain a constant ratio between pinion 23 and the large intermediate gear 37. This constant ratio may be, for example, in the order of 10 to 1 in a train whose overall reduction ratio covers a range from 10 to 1 to 100 to 1 since in practical applications calling for double reduction units the minimum reduction ratio desired is seldom less than 10 to 1. With this in mind, I obtain various overall reduction ratios by interchanging the second set of reduction gears, namely, small intermediate gear 38 and the output gear 57, with similar gears having different ratios. For example, if the ratio between input and output speeds required is 25 to 1, the selection of intermediate gear 38 and output gear 57 having an appropriate number of teeth, respectively, to give a reduction of 2.5 to 1 would be required since this ratio when multiplied by the fixed ratio between pinion 23 and intermediate gear 37, that is 10 to 1, gives the desired overall reduction of 25 to 1.

As mentioned above, in order to utilize the same housing or casing to enclose a number of different sets of gears having different reduction ratios, it is desirable that the center spacing between gears in the various sets of gears which are interchangeably mounted in the housing be substantially constant so that these gears will mesh properly when mounted on shafts 36 and 56. The interchange of gears 38 and 57 with another set of gears having a different ratio while maintaining the center distance A, see Figure 3, between shafts 36 and 56 and thus between these gears constant is accomplished by calculation of the number of teeth required on each gear in conjunction with the helical angle to which they are cut. The relation between the center distance between helical gears, the number of teeth on each gear and the helix angle to which the teeth are cut is expressed by the formula:

$$C = (N_a + N_b) \div 2 P_n \cos a$$

where $C$ is the center distance, $N_a$ and $N_b$ the number of teeth on each of the meshing gears, $P_n$ is the normal diametral pitch and $a$ is the helix angle to which the teeth are cut. Values for $N_a$ and $N_b$ are selected as explained below so that the ratio of $N_a/N_b$ represents the reduction ratio that is desired between gears 38 and 57, and since the values of the center distance $C$ and the normal pitch $P_n$ are known, the equation is solved to determine the value of the helix angle $a$ to which the teeth are to be cut. By selective variation of the number of teeth on each gear of the interchangeable pair, the center distance and the normal pitch of the gears being held constant and the helix angle of the teeth on these different pairs of gears being different, an exceedingly large number of different reduction ratios within practical limits may be attained.

The number of whole teeth $N_a$ and $N_b$ on each of the gears 38 and 57 and likewise on the other pairs of gears interchangeable therewith is selected so that the ratio $N_a/N_b$ gives the desired ratio between gears 38 and 57 and also so that the sum of the number of teeth on each gear 38 and 57, that is, $N_a + N_b$, is as close as possible to the sum of the number of teeth on the pair of gears whose reduction ratio represents the selected maximum or minimum limits of reduction of the interchangeable stage in the reducer. For example, a double reduction reducer having a maximum overall reduction of 100 to 1 and a fixed reduction between the driving pinion 23 and the first intermediate gear 37 of 10 to 1, may have 10 teeth on the second intermediate gear 38 and 100 teeth on the output gear 57, thereby giving a second reduction from the latter pair of gears of 10 to 1. In this case, the sum of $N_a$ and $N_b$ is 100+10 or 110 teeth. Next, assume that it is desired to assemble a reducer having an overall reduction ratio of 80 to 1. This would require a reduction of 8 to 1 between gears 38 and 57. The whole number values of $N_a$ and $N_b$ which give a ratio of 8 to 1 and whose sum is closest to 110 are 96 and 12. The values are then substituted in the above formula, the center distance $C$ and normal pitch $P_n$ being known and the value of $a$, the helix angle to which the teeth are to be formed, is determined. With these data a pair of helical gears is formed so that same may be mounted on shafts 36 and 56 within standardized housing 1 to give an overall reduction ratio of 80 to 1. Similarly, other pairs of gears 38 and 57 are formed so as to permit an exceedingly large number of reduction ratios to be attained from gear trains that are mounted in the standardized housing.

In event it is desired to change the overall reduction ratio of the assembled reducer, it is merely required that gears 38 and 57 be removed from the housing and another pair of gears having the desired secondary reduction ratio be substituted in their place on shafts 36 and 56. This is accomplished by loosening screws 49 and 54 on adapters 45 and 50, respectively, and removing these adapters. Bearings 43 and 44 are then removed and shaft 36 is slid axially through bearing hole 17 as intermediate gear 38 is unkeyed and pulled therefrom. Gear 38 may then be removed through the opening 9 in the top of the housing, the cover 10 having been removed, or through bearing hole 19 if the gear has a sufficiently small diameter to pass therethrough. Similarly, output gear 57 is removed from shaft 56 by removing adapters 62 and 63 and sliding shaft 56 axially through one of the bearing holes 18 or 20 and free of gear 57 which may then be removed through the top of the housing. The other pair of helical gears having the desired number of teeth, respectively, are then positioned within the housing and shafts 36 and 56 fed through the hubs of the gears and the keys inserted between the gears and shafts. Bearings and adapters are then replaced and secured and the reducer is ready for operation.

Various changes, modifications and improvements to the above illustrated and described speed reducer may be made by those skilled in the art without departing from the spirit and scope of my invention. Therefore I do not wish to be limited to the above described embodiment of my invention, the essential features of which are set forth in the appended claim.

I claim:

A speed reducer comprising a housing having side walls, end walls and a bottom wall, said side walls consisting of flat plates having substantially the same overall dimensions, said plates each having two bearing holes therein, said end walls and bottom wall being integral, means to secure said end walls and bottom wall to said side walls so as to define a chamber therebetween and with said bearing holes in each side wall in alignment, an input shaft extending through one of said side walls with the inner end thereof terminating between said side walls, bearings disposed in spaced relation on said input shaft, means for supporting said bearings on said one of said side walls, a pinion having helical teeth on the inner end of said input shaft, an intermediate shaft, an output shaft, bearings on the ends of said intermediate and output shafts, adapters having recesses for receiving said last named bearings and inserted in said aligned bearing holes in said side walls, means for removably securing said adapters to said side walls, a first helical gear non-rotatably mounted on said intermediate shaft and aligned with said pinion so as to mesh therewith, a second helical gear non-rotatably mounted on and removable from said intermediate shaft and disposed adjacent said first gear, an output helical gear non-rotatably and removably mounted on said output shaft and aligned with said second gear so as to mesh therewith, said second and output gears having a predetermined speed reduction ratio.

RICHARD H. SKIDMORE.

References Cited in the file of this patent

UNITED STATES PATENTS

| Number | Name | Date |
|---|---|---|
| 1,001,819 | Charlton | Aug. 29, 1911 |
| 1,039,258 | Cook | Sept. 24, 1912 |
| 1,042,769 | Collins et al. | Oct. 29, 1912 |
| 1,119,196 | Siebert | Dec. 1, 1914 |
| 1,205,027 | Ross | Nov. 14, 1916 |
| 1,864,549 | Paul | June 28, 1932 |
| 1,935,965 | Wahlberg | Nov. 21, 1933 |
| 2,091,320 | Kinsella et al. | Aug. 31, 1937 |
| 2,091,321 | Kinsella et al. | Aug. 31, 1937 |
| 2,126,691 | Schmitter | Aug. 9, 1938 |
| 2,304,030 | Schmitter | Dec. 1, 1942 |

FOREIGN PATENTS

| Number | Country | Date |
|---|---|---|
| 346,995 | Great Britain | Apr. 23, 1931 |